A. M. HARRIS.
DIRECTION INDICATOR.
APPLICATION FILED JAN. 14, 1916.

1,238,763.

Patented Sept. 4, 1917.

Witnesses

Inventor
Alfred M. Harris,
By Richard Oliver,
Attorney

UNITED STATES PATENT OFFICE.

ALFRED M. HARRIS, OF DETROIT, MICHIGAN, ASSIGNOR OF THREE-EIGHTHS TO JOSEPH J. SULLIVAN, OF DETROIT, MICHIGAN.

DIRECTION-INDICATOR.

1,238,763.  Specification of Letters Patent.  Patented Sept. 4, 1917.

Application filed January 14, 1916. Serial No. 72,155.

*To all whom it may concern:*

Be it known that I, ALFRED M. HARRIS, a citizen of the United States, residing at Detroit, in the county of Wayne and State of Michigan, have invented certain new and useful Improvements in Direction-Indicators, of which the following is a specification.

This invention relates to direction signals for automobiles or other vehicles, and as a particular object aims to provide a device of this character whereby the driver will be enabled to readily signal pedestrians or following cars an intended change of direction in the course of his vehicle.

A further object is to provide a direction signal which shall be readily applicable to either the forward or rear portions of an automobile or other vehicle in order to indicate simultaneously at each portion a change in the direction of the vehicle's travel to persons both approaching and following the car, whether on foot or driving other vehicles.

A still further object is to provide a signal of the simplest sort which will be usable either at night or in the daytime and which may be electrically controlled by the driver in such manner as not to interfere in any way with his operation of the ordinary driving mechanism, and at the same time to furnish an indicator of this type, which may be cheaply manufactured and also durable and efficient in operation.

The above and additional objects which will become apparent as this explanatory description proceeds, are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention, as it is reduced to practice, and throughout the several views of which like characters of reference designate similar parts:—

Figure 1:
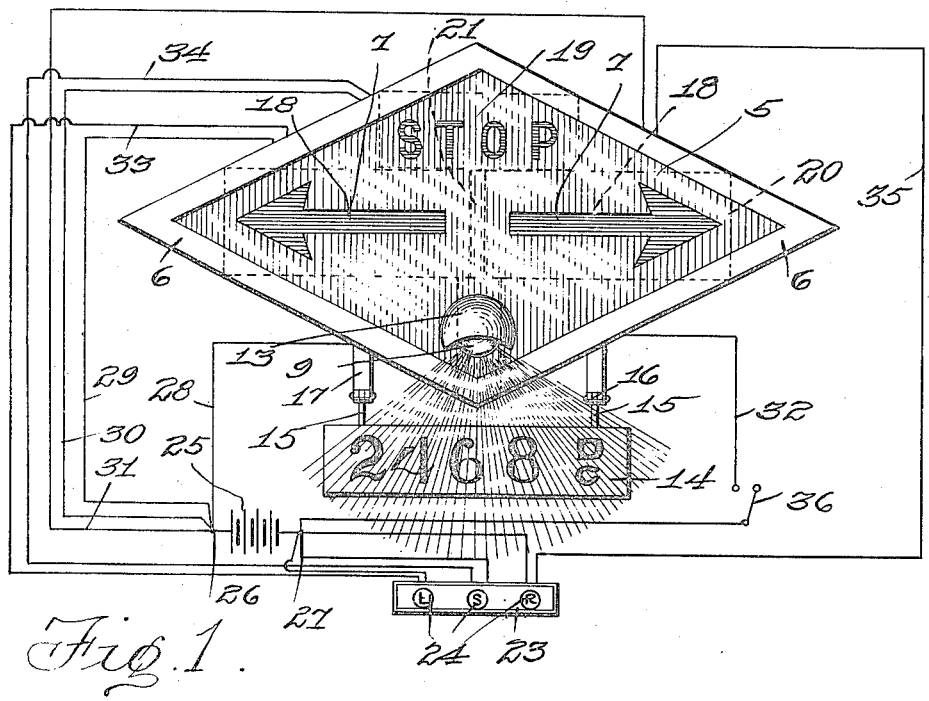
Figure 2:
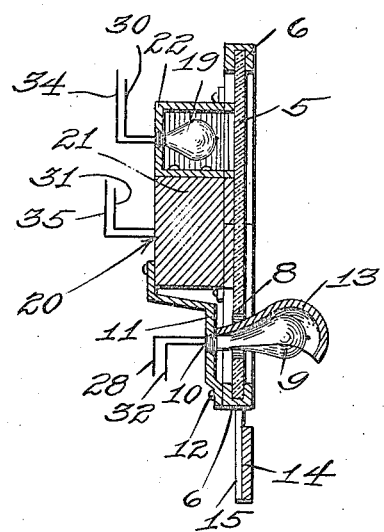

Figure 1 is an elevational view of the direction indicator comprehended by this invention with its wiring diagram, and Fig. 2 is a vertical sectional view through the device.

In attaining the objects of this invention, there is made use of an indicating plate designated as a whole by the numeral 5 and preferably constructed from glass or some other transparent material, the exposed edges of which may be protected by suitable binding 6, metallic or otherwise. A most convenient shape for this indicating plate is illustrated in the drawings in the diamond form which accommodates itself readily to certain necessary qualifications for a plate of this character. The background of the plate is preferably of a dark color in order to contrast with the oppositely directed laterally extending arrows 7 which are also transparent and preferably formed integrally with the main body of the indicating plate 5, although differently colored, such as white or a light red in order to attract attention by contact with the dark background when illuminated from behind as directed by this invention.

The arrows 7 are normally not distinctive enough to particularly attract attention until so illuminated and are adapted to be separately illumined in indicating a proposed turn of the vehicle to either the right or the left. The body 5 is formed with an aperture 8 adjacent the lower central corners of the diamond-shaped plate 5 in order to receive the incandescent lamp 9 which may be inserted through this aperture and removably secured as at 10 in a bracket 11 secured to the binding 6 by means 12 at this lowermost point. A reflector 13 is also secured to the bracket 11 and arranged over and partially around the lamp 9 in such manner as to direct the light from this latter upon a license plate 14 as particularly illustrated in Fig. 1, such plate being supported by hangers 15 forming hinged connections 16 with the bifurcated extremity of supports 17.

The illumination for the arrows 7 and for the "Stop" indication is assured by the incandescent lamps 18 and 19 respectively, the former being secured in a suitable box-like casing 20 in horizontal alinement separated by the partition 21 and each directly behind its respective arrow 7. The "Stop" indication is assured by forming the letters of this word in the back ground of the plate 5 in any manner similar to the arrows, and the lamp 19 to illuminate these letters is mounted within a casing 22 superimposed above the first casing 20 and like this latter presenting an open face to the rear of the plate 5.

Since suitable manual control means are to be provided for separately illuminating the lamps 18 and 19, a switch plate 23 is preferably positioned at some point adjacent the hand of the driver of the car and may indeed be inset into the rim of the steering wheel if desired. This plate carries a trio of buttons 24 adapted to make separable contacts and lettered respectively L, S and R and indicate the left arrow, the stop the right arrow. These button switches are adapted to be connected with their lamps in multiple with a suitable source of difference of potential 25 provided with terminals 26 and 27.

From the former terminal, wires 28, 29, 30 and 31 lead respectively to the license plate lamp 9, the left arrow lamp 18, the stop indicator, and the right arrow 18. From each of these lamps, return wires 32, 33, 34 and 35 respectively lead to the opposite battery terminal 27 and the last three of these include in their circuit the previously mentioned button switches normally maintained out of contact until depressed to allow the momentary lighting of the particular lamp to assure a signal of the intended direction of the vehicle to be given. The return wire 32, however, includes in circuit the single throw switch 36 whereby the license plate lamp may be turned out whenever desired without interfering with the operation of the other separate circuits.

From the foregoing it should be obvious, without necessitating any further discussion of the operation thereof, that means have been disclosed whereby the previously presented objects are capable of being accomplished so that this invention may, accordingly, be claimed as possessing the advantages and desirability set forth in such objects.

What is claimed is:

1. A signal comprising a transparent plate having indicia thereon and also provided with an opening, illuminating means for the transparent plate, a second plate mounted below the transparent plate and also having indicia thereon, and a reflector positioned in the opening in the transparent plate to project light rays upon the second mentioned plate.

2. A signal comprising a transparent plate having indicia thereon and further provided with an opening, a casing positioned behind the transparent plate and carrying illuminating means, a second plate mounted below the transparent plate and also having indicia thereon, and a reflector extending through the opening to project light rays upon the second mentioned plate.

3. A signal comprising a transparent plate having indicia thereon and further provided with an opening, a casing positioned behind the transparent plate and carrying illuminating means, means connected with the bracket and projecting through the opening, a reflector also carried by the bracket, and a license plate disposed below the reflector.

In testimony whereof I affix my signature in presence of two witnesses.

ALFRED M. HARRIS.

Witnesses:
W. E. FITCH,
JOHN J. BLAVET.